United States Patent
Izumi et al.

(10) Patent No.: US 12,206,689 B2
(45) Date of Patent: Jan. 21, 2025

(54) ABNORMALITY SENSING DEVICE AND ABNORMALITY SENSING METHOD

(71) Applicant: NIPPON TELEGRAPH AND TELEPHONE CORPORATION, Tokyo (JP)

(72) Inventors: Masami Izumi, Tokyo (JP); Tomoyasu Sato, Tokyo (JP); Takeshi Nakatsuru, Tokyo (JP); Takuya Minami, Tokyo (JP); Naoto Fujiki, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 923 days.

(21) Appl. No.: 17/255,897

(22) PCT Filed: Jun. 24, 2019

(86) PCT No.: PCT/JP2019/024928
§ 371 (c)(1),
(2) Date: Dec. 23, 2020

(87) PCT Pub. No.: WO2020/004315
PCT Pub. Date: Jan. 2, 2020

(65) Prior Publication Data
US 2021/0273964 A1    Sep. 2, 2021

(30) Foreign Application Priority Data
Jun. 27, 2018 (JP) ................................. 2018-121953

(51) Int. Cl.
*H04L 9/40* (2022.01)
*G06N 20/00* (2019.01)
*H04L 43/065* (2022.01)

(52) U.S. Cl.
CPC ......... *H04L 63/1425* (2013.01); *G06N 20/00* (2019.01); *H04L 43/065* (2013.01); *H04L 63/1416* (2013.01)

(58) Field of Classification Search
CPC ............ H04L 63/1425; H04L 63/1416; H04L 43/065; G06N 20/00; G06F 21/552; G06F 21/554
See application file for complete search history.

(56) References Cited

U.S. PATENT DOCUMENTS 7,225,343 B1 * 5/2007 Honig ..................... G06F 16/13
                                                    713/193
9,189,623 B1 * 11/2015 Lin ......................... G06Q 30/00
(Continued)

FOREIGN PATENT DOCUMENTS

JP    2004-312064 A    11/2004

OTHER PUBLICATIONS

Maggi et al. (2009) "Protecting a Moving Target: Addressing Web Application Concept Drift" RAID 2009, LNCS 5758, pp. 21-40.
(Continued)

*Primary Examiner* — Khoi V Le

(57) ABSTRACT

An anomaly detection device is provided with a learning unit that generates a detection model using a communication log during normal operation of a communication apparatus as learning data and an anomaly detection unit that detects anomaly of the communication apparatus using the generated detection model. The anomaly detection device is further provided with a data acquisition unit that acquires a communication log (second communication log) generated during a predetermined period later than a first communication log and a determination unit that instructs relearning using the second communication log when there is difference information between the learning data (first communication log) of the current detection model and the second
(Continued)

communication log and when the number of pieces of additional information (information on the additional flow) or the number of pieces of deletion information (information on the delete flow) included in the difference information satisfies predetermined evaluation criteria.

4 Claims, 5 Drawing Sheets

(56) References Cited

U.S. PATENT DOCUMENTS

| | | | |
|---|---|---|---|
| 9,202,052 B1* | 12/2015 | Fang | G06F 21/552 |
| 9,516,053 B1* | 12/2016 | Muddu | G06F 16/9024 |
| 2003/0101260 A1 | 5/2003 | Dacier et al. | |
| 2014/0258490 A1* | 9/2014 | Kim | H04L 63/0823 |
| | | | 726/5 |
| 2021/0194909 A1* | 6/2021 | Tang | H04L 63/1416 |

OTHER PUBLICATIONS

Koutrouki Evgenia (2017) "Mitigating concept drift in data mining applications for intrusion detection systems" International Hellenic University, School of Science & Technology, A thesis submitted for the degree of Master of Science in Communications and Cybersecurity, Thessaloniki, Greece, 48 pages.

* cited by examiner

ABNORMALITY SENSING DEVICE AND ABNORMALITY SENSING METHOD

CROSS-REFERENCE TO RELATED APPLICATIONS

This application is a U.S. 371 Application of International Patent Application No. PCT/JP2019/024928, filed on 24 Jun. 2019, which application claims priority to and the benefit of JP Application No. 2018-121953, filed on 27 Jun. 2018, the disclosures of which are hereby incorporated herein by reference in their entireties.

TECHNICAL FIELD

The present invention relates to an anomaly detection device and an anomaly detection method.

BACKGROUND ART

As methods for detecting anomaly caused by viral infection or the like in apparatuses such as a PC, a signature detection scheme that detects anomaly by matching a behavior pattern of an apparatus and a known anomaly pattern and an anomaly detection scheme that detects anomaly by matching a behavior pattern of an apparatus and a behavior pattern in a normal state have been conventionally proposed and used (see Patent Literature 1).

The signature detection scheme has an anomaly pattern defined in advance, and therefore while it is possible to detect anomaly when the apparatus behavior pattern matches the anomaly pattern, it is not possible to detect anomaly caused, for example, by an unknown virus, for which no anomaly pattern is defined in advance. On the other hand, the anomaly detection scheme learns a normal state using a machine learning technique as described in Patent Literature 1 and detects all behavior patterns that do not match the learned model as anomaly. The anomaly detection scheme can therefore detect anomaly caused by an unknown virus or the like. However, when the normal state is changed due to changes in apparatus settings or the like, behavior patterns that do not match past models are detected as anomaly by the anomaly detection scheme.

Here, since the related art (e.g., see Patent Literature 1) defines a behavior of an apparatus in a normal state used for the anomaly detection scheme based on past observation values, it is necessary to relearn the behavior in a normal state to follow the changes in the normal state caused by changes in apparatus settings or the like.

CITATION LIST

Patent Literature

Patent Literature 1: Japanese Patent Laid-Open No. 2004-312064

SUMMARY OF THE INVENTION

Technical Problem

Here, in an environment that cannot afford additional computation cost, it is not possible to frequently relearn a behavior of an apparatus in a normal state, and as a result, there is a concern that security may deteriorate. Therefore, in an environment that cannot afford additional computation cost, it is necessary to relearn the behavior in the normal state at appropriate timing. It is therefore an object of the present invention to solve the above problem and relearn a behavior of an apparatus in a normal state at appropriate timing.

Means for Solving the Problem

In order to solve the above problem, the present invention includes a learning unit that generates a detection model for detecting anomaly of a communication apparatus using a communication log during normal operation of the communication apparatus as learning data, an anomaly detection unit that detects anomaly of the communication apparatus using the generated detection model and the communication log of the communication apparatus, a data acquisition unit that acquires a second communication log, which is a communication log generated during a predetermined period after a first communication log, which is the communication log used to generate the detection model, an additional information identification unit that identifies a communication log of the second communication log in which the detection model detects anomaly as additional information of the first communication log, a deletion information identification unit that identifies deletion information obtained by removing the additional information of the first communication log from difference information between the first communication log and the second communication log, and a determination unit that instructs the learning unit to generate a detection model using the second communication log as the learning data when the additional information or deletion information of the first communication log is present if the number of pieces of the additional information or the number of pieces of deletion information satisfies predetermined evaluation criteria.

Effects of the Invention

According to the present invention, it is possible to relearn a behavior of an apparatus in a normal state at appropriate timing.

DESCRIPTION OF EMBODIMENT

Figure 1:
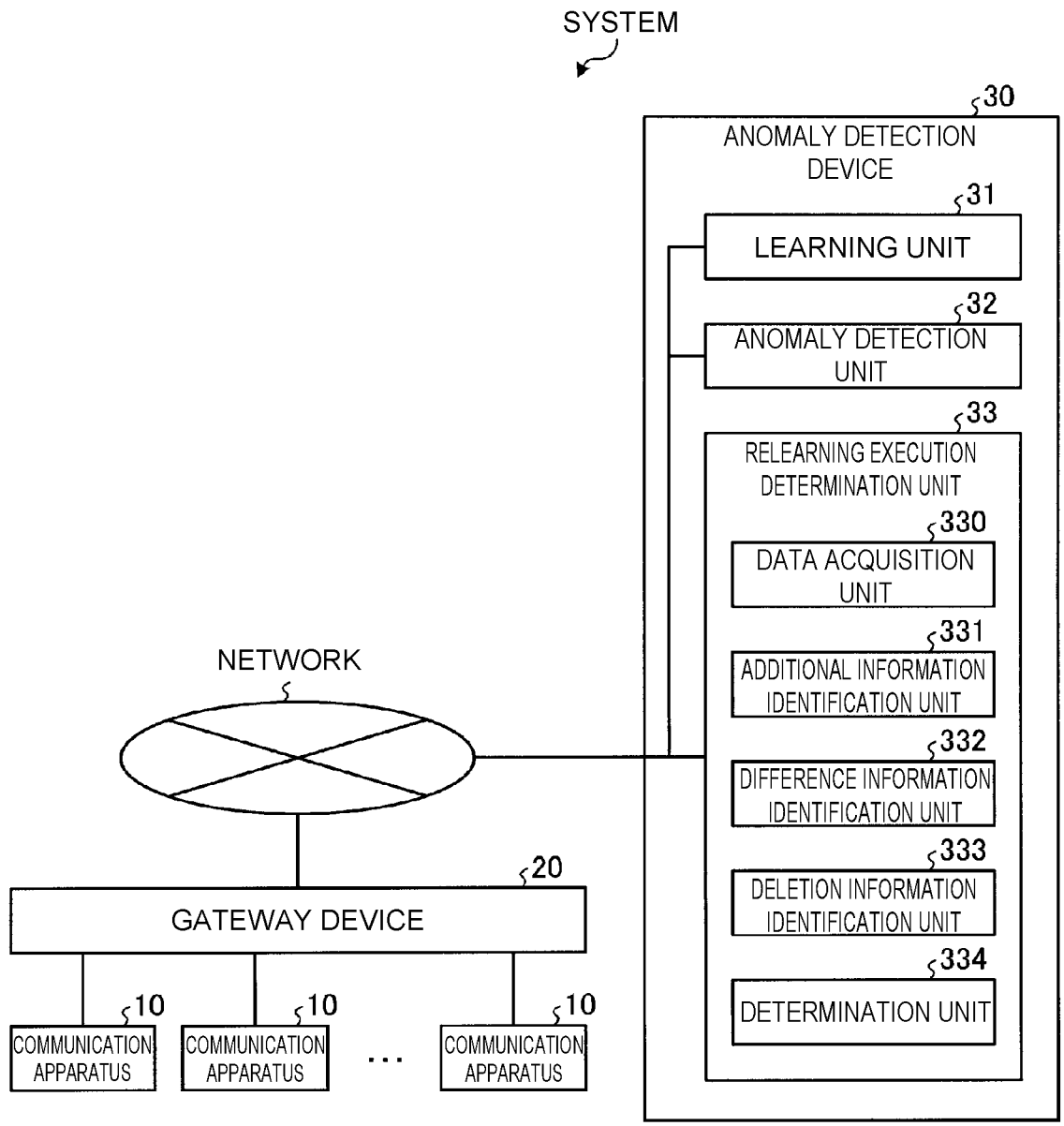
FIG. 1 is a diagram illustrating a configuration example of a system.

Hereinafter, an embodiment for implementing the present invention will be described with reference to the accompanying drawings. The present invention is not limited to the present embodiment.

[Configuration and Overview]

First, a configuration example of a system including an anomaly detection device of the present embodiment will be described using FIG. 1. As shown, for example, in FIG. 1, the system is provided with a communication apparatus 10, a gateway device 20 and an anomaly detection device 30. The communication apparatus 10 and the gateway device 20 are connected together via a LAN (local area network) or the like. The gateway device 20 and the anomaly detection device 30 are connected together via a network such as the Internet.

The communication apparatus 10 is a communication apparatus, which is a target of anomaly detection in the present system. The communication apparatus 10 is, for example, a PC. The gateway device 20 is a device that connects the communication apparatus 10 to an external device via a network such as the Internet or to another communication apparatus 10 within the same LAN. The gateway device 20 acquires information indicating a behavior of the communication apparatus 10. Information indicating a behavior of the communication apparatus 10 includes information on network flows transmitted/received by the respective communication apparatuses 10, communication feature values of the network flows and operation logs of the respective communication apparatuses 10 or the like.

Note that examples of information on a network flow (network flow information) include a source IP (internet protocol) address of the network flow, a source MAC (media access control) address, a destination IP address, a destination MAC address, a communication port number, the number of reception packets, the number of transmission packets, a communication payload. Examples of the communication feature value include a source IP address of the network flow, a source MAC address, a destination IP address, a destination MAC address, an average value of the total number of reception packets, a variance of the total number of transmission packets. Examples of the operation log include an ID of a process executed by the communication apparatus 10, a start time at which the process is executed.

The anomaly detection device 30 learns information indicating a behavior of each communication apparatus 10 in a normal state acquired from the gateway device 20. Thus, the anomaly detection device 30 detects abnormalities such as unauthorized access to each communication apparatus 10 or viral infection. The anomaly detection device 30 generates an anomaly detection type detection model using network flow information of each communication apparatus 10 in a normal state, a communication feature value of the network flow, an operation log of each communication apparatus or the like (which are collectively called "communication log") as learning data. The anomaly detection device 30 performs anomaly detection type anomaly detection using the generated detection model and the network flow information, the communication feature value, the operation log and the like of the communication apparatus 10, which is a detection target.

Here, the anomaly detection device 30 follows changes in a normal state caused by setting changes or the like of each communication apparatus 10. Therefore, the anomaly detection device 30 relearns communication logs of each communication apparatus 10 in the normal state and updates the detection model using the relearning result.

For example, the anomaly detection device 30 acquires a communication log (learning data set B) of each communication apparatus 10 generated after a communication log (learning data set A) used to generate the current detection model A. Here, when the difference information between the acquired learning data set B and the learning data set A satisfies predetermined evaluation criteria, the anomaly detection device 30 performs relearning using the learning data set B. In this way, the anomaly detection device 30 can relearn the behavior of the communication apparatus 10 in the normal state at appropriate timing even in an environment that cannot afford additional computation cost.

[Anomaly Detection Device]

The anomaly detection device 30 will continue to be described in detail using FIG. 1. The anomaly detection device 30 is provided with a learning unit 31, an anomaly detection unit 32 and a relearning execution determination unit 33.

The learning unit 31 generates a detection model to detect anomaly of the communication apparatus 10 using a communication log of the communication apparatus 10 in a normal state as learning data. For example, when the learning unit 31 acquires a communication log of each communication apparatus 10 in a normal state from the gateway device 20, the learning unit 31 generates a detection model to detect anomaly of each communication apparatus 10 using the communication log as learning data.

When the learning using learning data is completed and the detection model is generated, the learning unit 31 causes the anomaly detection unit 32 to start anomaly detection (analysis for anomaly detection) using the detection model. The learning unit 31 saves the following three items in the relearning execution determination unit 33. The first one is identification information of the communication apparatus 10 used for the learning, the second one is the communication log (learning data set A) and the third one is the detection model (detection model A) generated by learning of the communication log.

The anomaly detection unit 32 performs anomaly detection type anomaly detection on the communication apparatus 10 using the detection model generated by the learning unit 31 and the communication log of the communication apparatus 10. For example, when the anomaly detection unit 32 acquires the communication log of the communication apparatus 10, which is the detection target, from the gateway device 20, the anomaly detection unit 32 performs anomaly detection of the communication apparatus 10 using the detection model generated by the learning unit 31.

The relearning execution determination unit 33 determines whether or not the learning unit 31 should execute relearning of the communication log. The relearning execution determination unit 33 is provided with a data acquisition unit 330, an additional information identification unit 331, a difference information identification unit 332, a deletion information identification unit 333 and a determination unit 334.

Every predetermined period or when an instruction is inputted from an administrator of the anomaly detection device 30, the data acquisition unit 330 acquires a communication log (second communication log) for a predetermined period from the point in time about the predetermined communication apparatus 10 from the gateway device 20.

The additional information identification unit 331 identifies the communication log of the second communication log acquired by the data acquisition unit 330 in which anomaly is detected by the detection model (detection model A) currently used in the anomaly detection unit 32 as additional information.

The difference information identification unit 332 compares the communication log (learning data set A) used to generate the detection model A with the second communication log (learning data set B) acquired by the data acquisition unit 330 and determines the presence or absence of the difference information.

For example, when the learning data sets A and B to be compared are the network flow information or communication feature values of the communication apparatus 10, the difference information identification unit 332 compares 5-tuple information (source/destination IP address, source/destination MAC address and communication port number) of the learning data sets A and B. For example, when the learning data sets A and B are operation logs of the communication apparatus 10, the difference information identification unit 332 compares the IP address, MAC address and communication port of the destination communication apparatus of the communication apparatus 10.

The deletion information identification unit 333 identifies deletion information obtained by removing the additional information from the difference information between the first communication log (learning data set A) and the second communication log (learning data set B).

The additional information and the deletion information will be described in detail with reference to FIG. 2.

Figure 2:
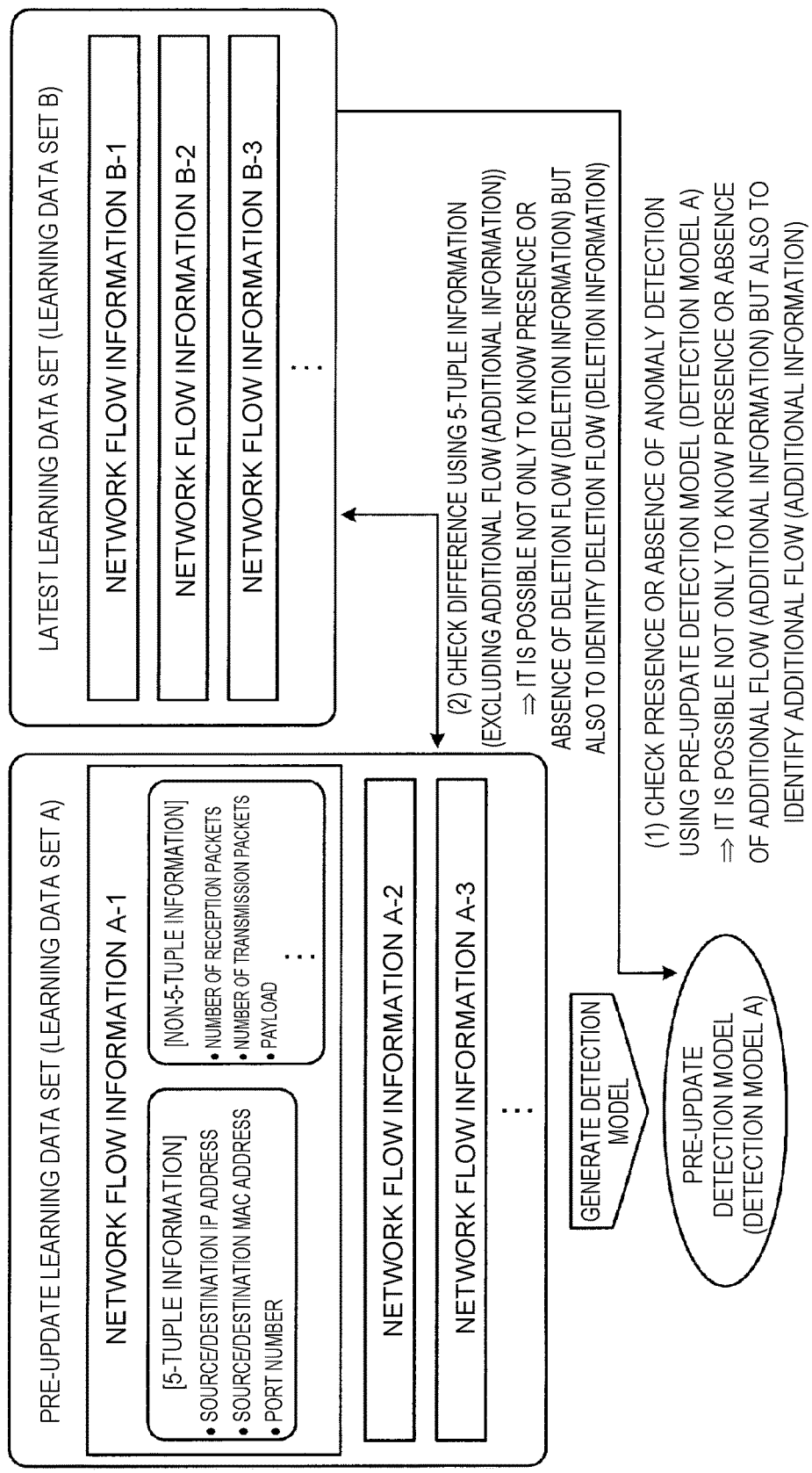
FIG. 2 is a diagram for describing additional information and deletion information according to the present embodiment.

For example, as shown in FIG. 2, a case will be assumed where the learning data set A (network flow information A-1, A-2, A-3, . . . ) used to generate the pre-update detection model (detection model A) and the latest learning data set (learning data set B, network flow information B-1, B-2, B-3, . . . ) are given. Each piece of network flow information may include not only the 5-tuple information but also non-5-tuple information (e.g., the number of reception packets, the number of transmission packets, payload) as shown in FIG. 2.

In such a case, the additional information identification unit 331 checks the presence or absence of anomaly detection in the learning data set B using the pre-update detection model (detection model A), and can thereby not only know the presence or absence of an additional flow (additional information) in the learning data set B but also identify the additional flow (additional information) ((1)).

That is, the fact that anomaly has been detected in the learning data set B using the detection model A means that the learning data set B includes a communication log (communication log of the additional flow) with the communication destination, which is not found in the learning data set A. Thus, if there is a communication log of the learning data set B in which anomaly is detected using the detection model A, the difference information identification unit 332 identifies the communication log as additional information.

Next, the difference information identification unit 332 checks a difference (difference information) between both data sets using 5-tuple information of the learning data set A and the learning data set B, and if difference information is found, the deletion information identification unit 333 removes the additional flow (additional information) from the difference information. This allows the deletion information identification unit 333 not only to know the presence or absence of a deletion flow (deletion information) but also to identify the deletion flow (deletion information) ((2)).

That is, the fact that although there is a difference (difference information) between the learning data set A and the learning data set B, there is information (communication log) other than the additional flow (additional information) means that there is a communication destination not included in the learning data set B among the communication destinations included in the learning data set A. That is, it means that there is a deletion flow. Therefore, if information (communication log) other than the additional information is found in the difference information between the learning data set A and the learning data set B, the deletion information identification unit 333 identifies the communication log as the deletion information.

Returning to FIG. 1, the determination unit 334 will be described. When there is difference information between the first communication log (learning data set A) and the second communication log (learning data set B), the determination unit 334 instructs the learning unit 31 to generate (to relearn) an anomaly detection model using the second communication log (learning data set B) as the learning data.

For example, when there is difference information between the first communication log (learning data set A) and the second communication log (learning data set B), if the number of pieces of additional information or the number of pieces of deletion information included in the difference information satisfies predetermined evaluation criteria, the determination unit 334 instructs the learning unit 31 to execute relearning using the second communication log (learning data set B) as the learning data.

For example, (1) when the number of pieces of additional information exceeds a predetermined threshold, (2) when the number of pieces of deletion information exceeds a predetermined threshold, or (3) when the total number of pieces of additional information and deletion information exceeds a predetermined threshold, the determination unit 334 instructs the learning unit 31 to execute relearning.

Note that the thresholds used in (1) to (3) may be determined by the user of the anomaly detection device 30 or may be determined by the anomaly detection device 30 based on past statistical values or the like.

When there is difference information between the first communication log (learning data set A) and the second communication log (learning data set B), if evaluation criteria described by any one of (1) to (3) or a combination of (1) to (3) is satisfied, the determination unit 334 may instruct the learning unit 31 to execute relearning. Note that the user of the anomaly detection device 30 can set as appropriate what evaluation criteria should be used by the determination unit 334 in making a determination.

When the relearning by the learning unit 31 is completed and a new detection model (detection model B) is generated, the learning unit 31 causes the anomaly detection unit 32 to start anomaly detection (analysis for anomaly detection) using the detection model B. The learning unit 31 overwrites and saves the identification information of the communication apparatus 10 used for relearning, the communication log (learning data set B) and the detection model (detection model B) generated by learning the communication log into the relearning execution determination unit 33.

Figure 3:
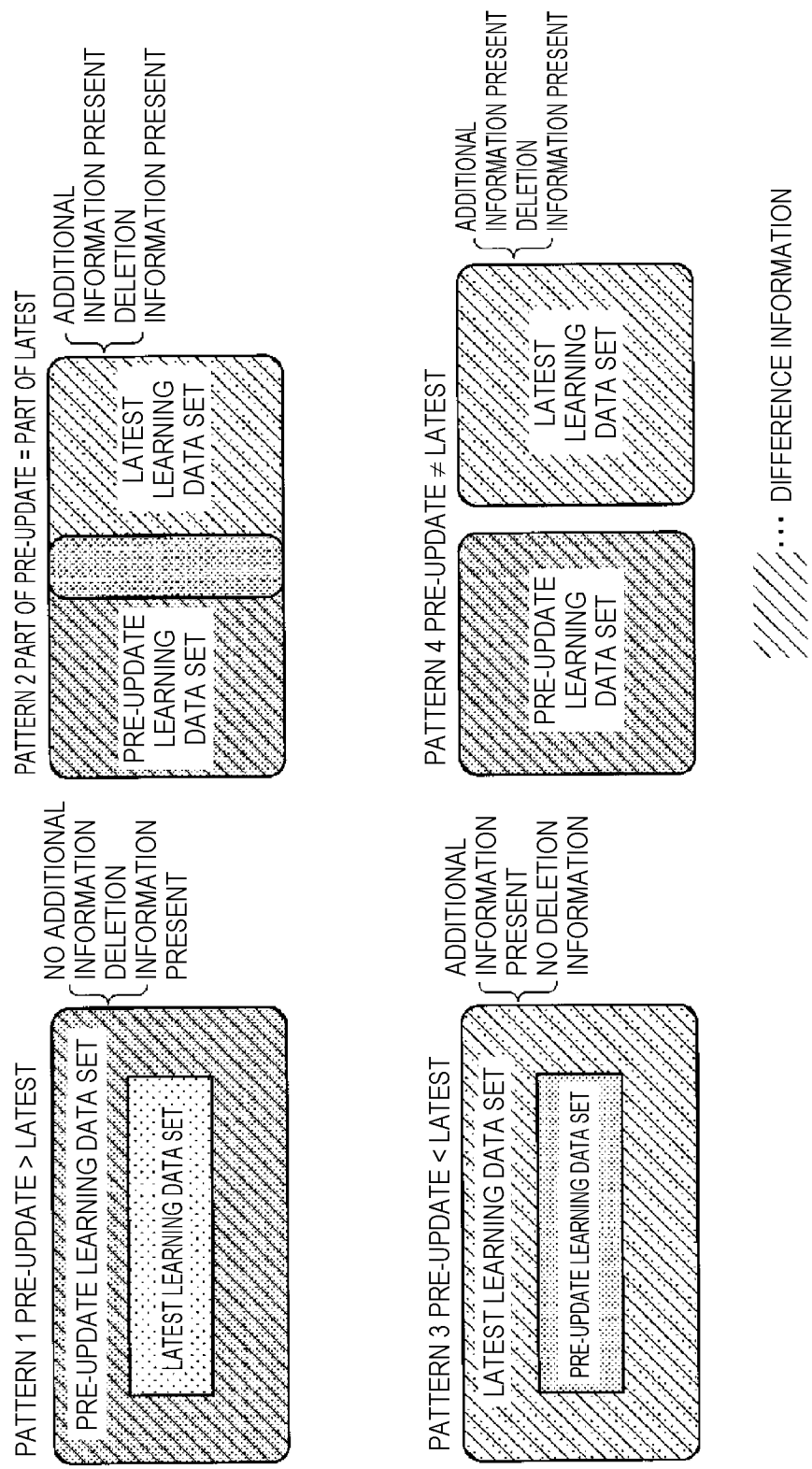
FIG. 3 is a diagram for describing difference information between pre-update learning data set and latest learning data set, additional information and deletion information.

Note that a relationship between the pre-update learning data set (learning data set A) and the latest learning data set (learning data set B) can be assumed to be patterns 1 to 4 shown in FIG. 3. That is, it is possible to assume a case where all the latest learning data set is included in the pre-update learning data set as in pattern 1, a case where part of the pre-update learning data set is included in part of the latest learning data set as in pattern 2, a case where all the pre-update learning data set is included in the latest learning data set as in pattern 3 and a case where the pre-update learning data set is completely different from the latest learning data set as in pattern 4.

Note that hatched areas in patterns 1 to 4 in FIG. 3 represent difference information between the pre-update learning data set and the latest learning data set in the respective patterns. In the case of pattern 1, the difference information does not include additional information but does include deletion information. In the cases of patterns 2 and 4, the difference information includes both additional information and deletion information. In the cases of pattern 3, the difference information includes additional information, but does not include deletion information. Thus, in the case of pattern 1, the learning unit 31 can generate a detection model with few overlooked abnormalities by learning the latest learning data set. In the cases of patterns 2 and 4, the learning unit 31 can generate a detection model with few overlooked abnormalities and few erroneous detections by learning the latest learning data set. In the case of pattern 3, the learning unit 31 can generate a detection model with few erroneous detections by learning the latest learning data set.

In the anomaly detection device 30, the determination unit 334 makes a determination whether or not to execute relearning according to evaluation criteria using additional information or deletion information (or combination of these pieces of information). This allows the anomaly detection device 30 to instruct the learning unit 31 to execute relearning at appropriate timing in any one of the above patterns.

The above examples are given below. (1) When the number of pieces of additional information exceeds a predetermined value, the determination unit 334 instructs the learning unit 31 to perform relearning, and can thereby realize relearning using the latest learning data set in pattern 2, 3 or 4. As a result, the learning unit 31 can generate a detection model with few erroneous detections. (2) When the number of pieces of deletion information exceeds a predetermined value, the determination unit 334 instructs the learning unit 31 to perform relearning, and can thereby realize relearning using the latest learning data set in pattern 1, 2 or 4. As a result, the learning unit 31 can generate a detection model with few overlooked abnormalities. (3) When the total number of pieces of additional information and deletion information exceeds a predetermined value, the determination unit 334 instructs the learning unit 31 to perform relearning, and can thereby realize relearning using the latest learning data set in pattern 2 or 4. As a result, the learning unit 31 can generate a detection model with few erroneous detections and few overlooked abnormalities.

[Processing Procedure]

Figure 4:
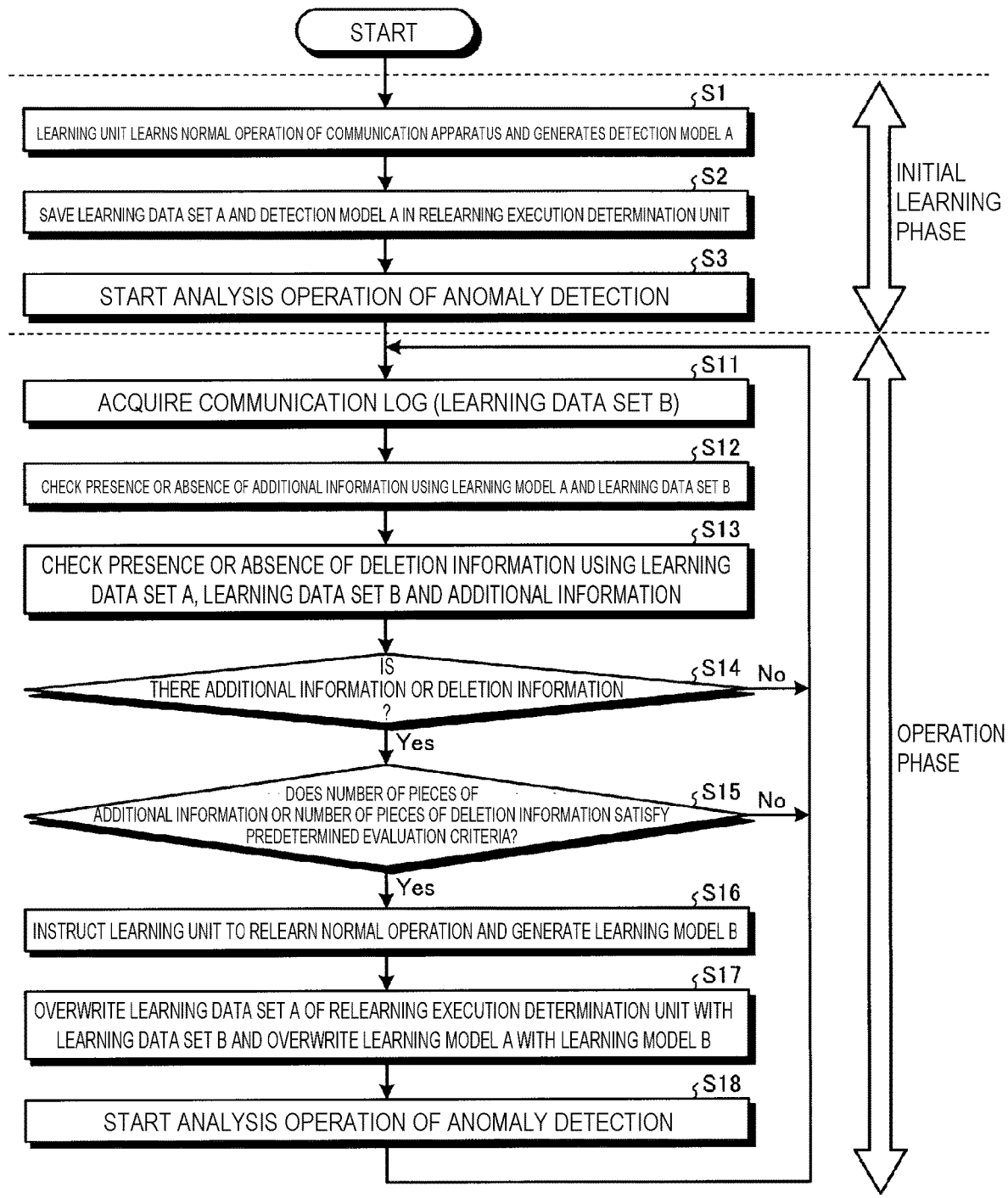
FIG. 4 is a flowchart illustrating an example of a processing procedure of the anomaly detection device in FIG. 1.

Next, a processing procedure of the anomaly detection device 30 will be described using FIG. 4. The processing of the anomaly detection device 30 can be divided into the following two phases. The first phase is an initial learning phase of generating an initial detection model and the second phase is an operation phase of updating a detection model by relearning. Description will start with the initial learning phase.

(Initial Learning Phase)

First, the learning unit 31 learns normal operation (learning data set A) of the communication apparatus 10 and generates a detection model A (S1). The learning unit 31 then saves the learning data set A and the detection model A in the relearning execution determination unit 33 (S2). The learning unit 31 causes the anomaly detection unit 32 to start analysis operation of anomaly detection using the detection model (S3).

(Operation Phase)

Next, an operation phase will be described. After S3, the data acquisition unit 330 acquires a communication log (learning data set B) after learning data set A (S11). After that, the additional information identification unit 331 checks the presence or absence of additional information using the detection model A and the learning data set B (S12). That is, the additional information identification unit 331 checks whether or not the learning data set B includes a communication log in which anomaly is detected using the detection model A. If the communication log is found, the additional information identification unit 331 identifies the communication log as additional information. After that, the deletion information identification unit 333 checks the presence or absence of deletion information using the learning data set A, the learning data set B and the additional information (S13). That is, first, the difference information identification unit 332 checks the presence or absence of a difference between the learning data set A and the learning data set B. If there is a difference, the deletion information identification unit 332 identifies a communication log of the difference as difference information. The deletion information identification unit 333 checks whether or not the difference information includes a communication log other than the additional information identified in S12. If the communication log is found, the deletion information identification unit 333 identifies the communication log as deletion information.

After S13, when there is additional information or deletion information (that is, there is difference information) (Yes in S14), and the number of pieces of additional information or the number of pieces of deletion information satisfies predetermined evaluation criteria (e.g., (1) to (3) described above) (Yes in S15), the determination unit 334 instructs the learning unit 31 to relearn the normal operation and generate the detection model B (S16). That is, the determination unit 334 instructs the learning unit 31 to learn the learning data set B and generate the detection model B. In this way, the learning unit 31 generates the detection model B. After that, the learning unit 31 overwrite the learning data set A of the relearning execution determination unit 33 with the learning data set B and overwrites the detection model A with the detection model B (S17). The learning unit 31 causes the anomaly detection unit 32 to start analysis operation of anomaly detection using the detection model (detection model B) overwritten in S17 (S18). After that, the process of the anomaly detection device 30 returns to S11.

Note that when the determination unit 334 determines that there is neither additional information nor deletion information (that is, there is no difference information) (No in S14), the process of the anomaly detection device 30 returns to S11. When the determination unit 334 determines that the number of pieces of additional information or the number of pieces of deletion information does not satisfy predetermined evaluation criteria (e.g., (1) to (3) described above) (No in S15), the process of the anomaly detection device 30 also returns to S11.

Thus, the anomaly detection device 30 determines whether or not to execute relearning based on the evaluation criteria using the number of pieces of additional information or the number of pieces of deletion information in the learning data set. That is, the anomaly detection device 30 determines whether or not to execute relearning based on the number of additional flows or the number of deletion flows after generating the current detection model. As a result, the anomaly detection device 30 can execute relearning at appropriate timing.

Note that although it has been assumed that the anomaly detection device 30 determines whether or not to execute relearning based on the evaluation criteria using the number of pieces of additional information or the number of pieces of deletion information in the learning data set, the present invention is not limited to this. For example, the anomaly detection device 30 may determine to execute relearning when there is difference information regardless of the presence or absence of additional information or deletion information in the learning data set.

[Program]

The functions of the anomaly detection device 30 described in the above embodiment can be implemented by installing a program for implementing such functions in a desired information processing device (computer). For example, by causing an information processing device to execute the above program provided as package software or on-line software, it is possible to cause the information processing device to function as the anomaly detection device 30. Examples of the information processing device referred to here include a desktop type or notebook type personal computer. In addition, the category of the information processing device includes mobile communication terminals such as smartphones, mobile phone sets, and PHS (personal handyphone system) or PDA (personal digital assistant). Moreover, the anomaly detection device 30 may be implemented on a cloud server.

Figure 5:
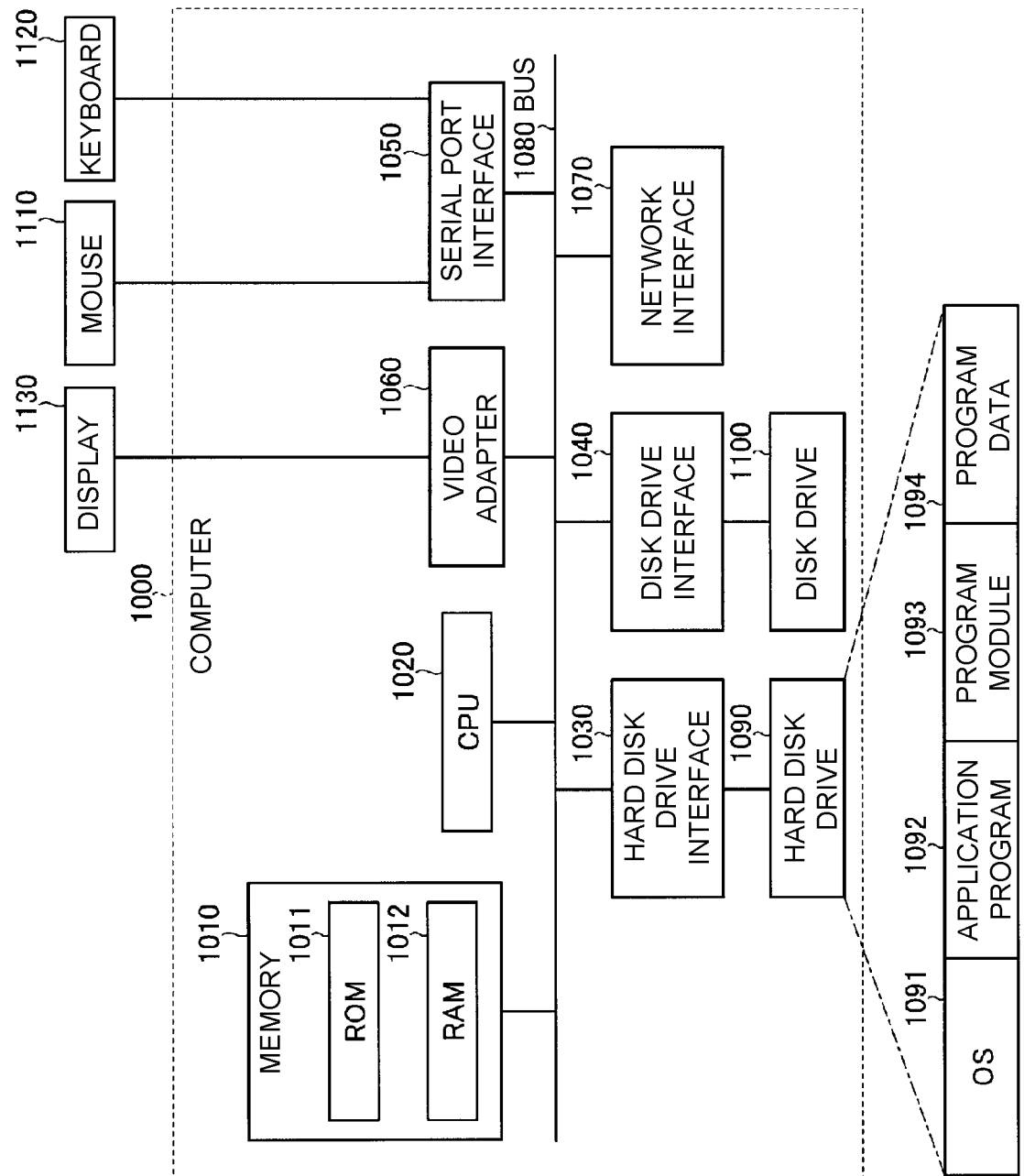
FIG. 5 is a diagram illustrating an example of a computer that executes an anomaly detection program.

An example of the computer that executes the above program (management program) will be described using FIG. 5. As shown in FIG. 5, a computer 1000 includes, for example, a memory 1010, a CPU 1020, a hard disk drive interface 1030, a disk drive interface 1040, a serial port interface 1050, a video adapter 1060 and a network interface 1070. These components are connected by a bus 1080.

The memory 1010 includes a ROM (read only memory) 1011 and a RAM (random access memory) 1012. The ROM 1011 stores, for example, a boot program such as BIOS (basic input output system). The hard disk drive interface 1030 is connected to a hard disk drive 1090. The disk drive interface 1040 is connected to a disk drive 1100. A removable storage medium such as a magnetic disk or an optical disk is inserted into the disk drive 1100. For example, a mouse 1110 and a keyboard 1120 are connected to the serial port interface 1050. For example, a display 1130 is connected to the video adapter 1060.

Here, as shown in FIG. 5, the hard disk drive 1090 stores, for example, an OS 1091, an application program 1092, a program module 1093 and program data 1094. Various kinds of data and information described in the above embodiment are stored, for example, in the hard disk drive 1090 and the memory 1010.

The CPU 1020 reads the program module 1093 and the program data 1094 stored in the hard disk drive 1090 into the RAM 1012 as needed and executes the respective aforementioned procedures.

Note that program module 1093 and the program data 1094 associated with the above management program are not only stored in the hard disk drive 1090, but those programs may be stored in a removable storage medium and may be read by the CPU 1020 via the disk drive 1100 or the like. Alternatively, the program module 1093 and the program data 1094 associated with the above program may be stored in other computers connected via a network such as a LAN (local area network) or a WAN (wide area network) and read by the CPU 1020 via the network interface 1070.

REFERENCE SIGNS LIST 10 communication apparatus
20 gateway device
30 anomaly detection device
31 learning unit
32 anomaly detection unit
33 relearning execution determination unit
330 data acquisition unit
331 additional information identification unit
332 difference information identification unit
333 deletion information identification unit
334 determination unit

The invention claimed is:

1. An anomaly detection device comprising:
a memory, and
a processor coupled to the memory and programmed to execute a process comprising:
  generating a first detection model for detecting anomaly of a communication apparatus using a learning communication log as learning data, wherein the learning communication log is based on normal operations of the communication apparatus;
  detecting anomaly of the communication apparatus using the generated first detection model and a generated communication log of the communication apparatus:
  acquiring a second communication log, wherein the second communication log is generated during a predetermined period after a first communication log is generated, and the first communication log corresponds to the learning communication log used to generate the first detection model;
  identifying a third communication log in the second communication log, wherein the third communication log includes anomaly detected by the first detection model as additional data to the first communication log, wherein the additional data indicates an additional communication destination being specified for communication after the first communication log is generated;
  identifying deletion data by removing the additional data from a difference between the first communication log and the second communication log, wherein the deletion data indicates a communication destination that is no longer being specified for communication after the first communication log is generated; and
  instructing to generate a second detection model using the second communication log as learning data when a number of pieces of the additional data or deletion data satisfies predetermined evaluation criteria.

2. The anomaly detection device according to claim 1, wherein, based at least on one of:
  when the number of pieces of the additional data or the deletion data exceeds a predetermined threshold,
  when the number of pieces of the deletion data exceeds a predetermined threshold, or
  when the total number of pieces of the additional data and the deletion data exceeds a predetermined threshold,
  instructing to generate the second detection model using the second communication log as learning data.

3. The anomaly detection device according to claim 1, wherein the generated communication log of the communication apparatus comprises at least one of:
  information on network flows transmitted/received by the communication apparatus,
  communication feature values of the network flows, and
  operation logs of the communication apparatus.

4. An anomaly detection method comprising:
generating a first detection model using a learning communication log as learning data, wherein the learning communication log is based on normal operations of a communication apparatus;
detecting anomaly of the communication apparatus using the generated first detection model and a generated communication log of the communication apparatus;

acquiring a second communication log, wherein the second communication log generated during a predetermined period later than when a first communication log is generated, and the first communication log corresponds to the learning communication log used to generate the first detection model;

identifying a third communication log in the second communication log, wherein the third communication log includes anomaly detected as an additional data to the first communication log, wherein the additional data indicates an additional communication destination being specified for communication after the first communication log is generated;

identifying deletion data by removing the additional data from a difference between the first communication log and the second communication log, wherein the deletion data indicates a communication destination that is no longer being specified for communication after the first communication log is generated; and instructing to generate a second detection model using the second communication log as learning data when a number of pieces of the additional data or the deletion data satisfies predetermined evaluation criteria.

* * * * *